(12) United States Patent
Chen et al.

(10) Patent No.: US 7,916,790 B2
(45) Date of Patent: Mar. 29, 2011

(54) PIXEL COMPENSATION METHOD FOR AN IMAGE SENSOR

(75) Inventors: Mei-Ju Chen, Hsinchu Hsien (TW); Tzu-Yi Chao, Hsinchu Hsien (TW)

(73) Assignee: PixArt Imaging Incorporation, Hsin-Chu (TW)

( * ) Notice: Subject to any disclaimer, the term of this patent is extended or adjusted under 35 U.S.C. 154(b) by 1342 days.

(21) Appl. No.: 11/420,612

(22) Filed: May 26, 2006

(65) Prior Publication Data
US 2006/0268134 A1    Nov. 30, 2006

(30) Foreign Application Priority Data
May 30, 2005    (TW) ............................... 94117650 A

(51) Int. Cl.
*H04B 1/66*    (2006.01)
(52) U.S. Cl. ................................. 375/240.16
(58) Field of Classification Search ......... 375/240.16–240.29; 348/398.1, 348/158–160, 14.02, 155; *H04B 1/66*
See application file for complete search history.

(56) References Cited

U.S. PATENT DOCUMENTS

| | | | |
|---|---|---|---|
| 6,122,004 A * | 9/2000 | Hwang | 348/208.13 |
| 6,370,330 B2 * | 4/2002 | Sekine et al. | 396/54 |
| 6,434,276 B2 * | 8/2002 | Hirosawa et al. | 382/284 |
| 7,218,675 B1 * | 5/2007 | Takahashi | 375/240.16 |
| 7,646,891 B2 * | 1/2010 | Kage et al. | 382/107 |
| 2005/0237433 A1 * | 10/2005 | Van Dijk et al. | 348/702 |

* cited by examiner

*Primary Examiner* — Tung Vo
(74) *Attorney, Agent, or Firm* — Tung & Associates

(57) ABSTRACT

A pixel compensation method is implemented by an image-capturing device having an image sensor for obtaining a pixel pattern of a plurality of pixels, in which each of the pixels has a response intensity. The pixel compensation method includes: a) selecting a first block of a predetermined number of pixels from the pixel pattern obtained by the image sensor; b) designating at least one pixel from the pixels of the first block as a stand-by compensation pixel; c) determining a first compensation value according to the response intensities of the pixels of the first block; and d) adjusting the response intensity of the stand-by compensation pixel according to the first compensation value.

14 Claims, 3 Drawing Sheets

PIXEL COMPENSATION METHOD FOR AN IMAGE SENSOR

CROSS-REFERENCE TO RELATED APPLICATION

This application claims priority of Taiwanese Application No. 094117650, filed on May 30, 2005.

BACKGROUND OF THE INVENTION

1. Field of the Invention

The present invention relates to a pixel compensation method for an image sensor, more particularly to a method for performing compensation of response intensities of pixels in a pattern obtained by an image sensor.

2. Description of the Related Art

An image-capturing device, such as a digital camera, includes an image sensor. The image sensor is typically a complementary metal oxide semiconductor (CMOS) sensor or a charge coupled device (CCD) sensor. The image sensor converts light into electrons at photosites. By placing a color filter array, such as a Bayer filter, over the sensor, a mosaic pattern of red, green, and blue pixels of different intensities is obtained. A demosaicing algorithm is then used to convert the mosaic of separate colors into an equally sized mosaic of true colors. As an example, the true color of a single pixel can be determined by averaging the values from the closest surrounding pixels by using interpolation techniques.

However, prior to performing demosaicing, the response intensities of the pixels may be uneven at areas where there should be uniformity due to such factors as lighting, circuit design characteristics, color differences, and defects in a lens of the image-capturing device. Such an adverse affect to the response intensities of the pixels is particularly marked among pixels of different columns and rows of the obtained pattern. Differences in pixel response intensities may cause color spots of localized color unevenness.

SUMMARY OF THE INVENTION

Therefore, the object of this invention is to provide a pixel compensation method for an image sensor that can make uniform response intensities of pixels in a pattern obtained by the image sensor, and in so doing overcome the problem of image color unevenness.

According to this invention, a pixel compensation method is implemented by an image-capturing device having an image sensor for obtaining a pixel pattern of a plurality of pixels, in which each of the pixels of the pixel pattern has a response intensity. The pixel compensation method includes: a) selecting a first block of a predetermined number of pixels from the pixel pattern obtained by the image sensor, the predetermined number of pixels of the first block being less than a total number of pixels of the pixel pattern; b) designating at least one pixel from the pixels of the first block as a stand-by compensation pixel; c) determining a first compensation value according to the response intensities of the pixels of the first block; and d) adjusting the response intensity of the stand-by compensation pixel according to the first compensation value.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
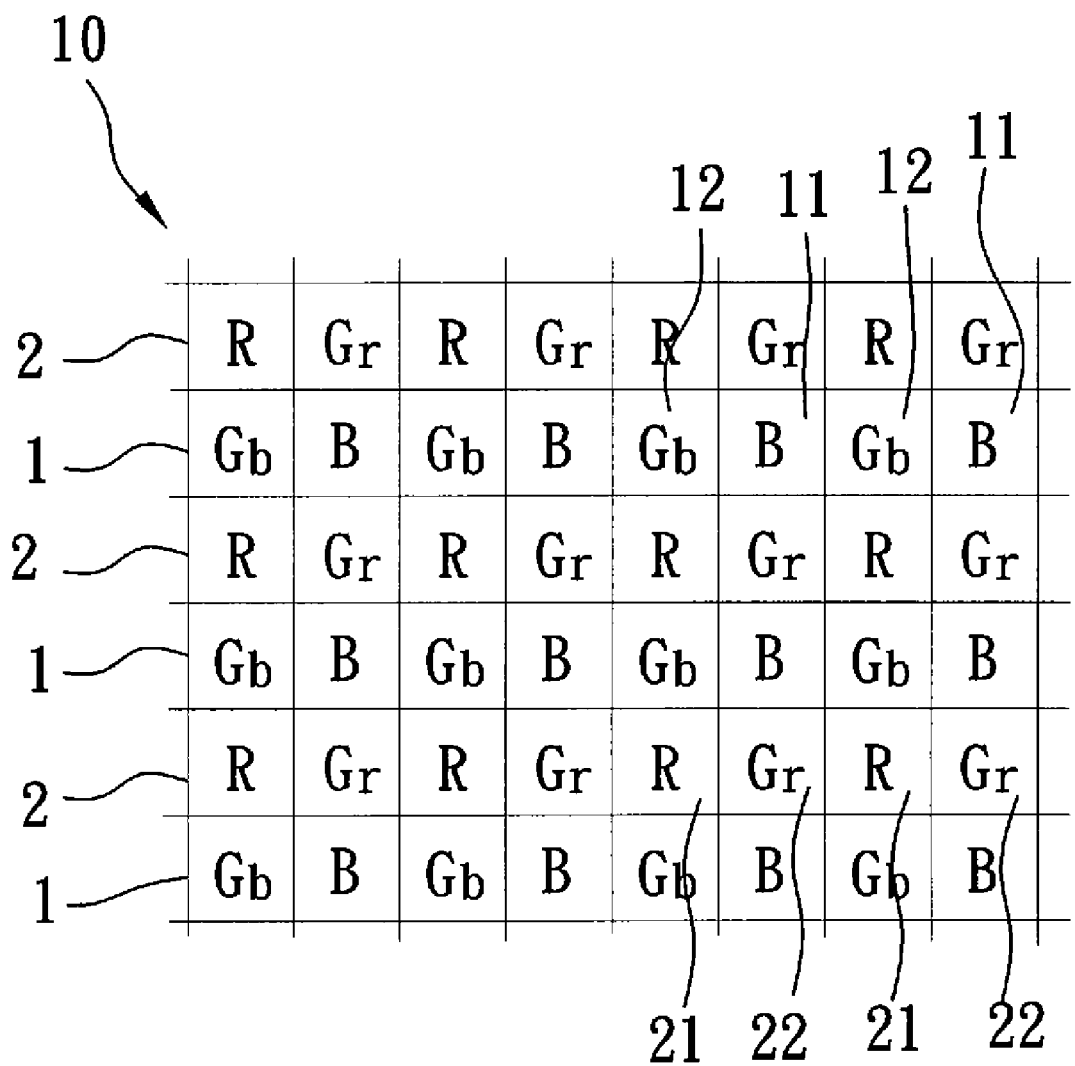
FIG. 1 is a fragmentary schematic view of a pattern obtained by an image sensor that is used in conjunction with a color filter array.

FIG. 1 is a fragmentary schematic view of a pattern 10 obtained by an image sensor when used in conjunction with a color filter array (CFA). The image sensor may be a complementary metal oxide semiconductor (CMOS) sensor or a charge coupled device (CCD) sensor. The CFA may be of the Bayer filter type.

The pattern 10 includes a plurality of blue rows 1, and a plurality of red rows 2 arranged alternatingly with the blue rows 1. Within each of the blue rows 1, a plurality of blue pixels 11 and a plurality of blue-row green pixels 12 are alternatingly arranged, and within each of the red rows 2, a plurality of red pixels 21 and a plurality of red-row green pixels 22 are alternatingly arranged. Further, the blue pixels 11 and the red-row green pixels 22 are arranged alternatingly in columns, and the blue-row green pixels 12 and the red pixels 21 are arranged alternatingly in columns. Hence, the columns formed by the blue pixels 11 and the red-row green pixels 22 are alternatingly arranged with the columns formed by the blue-row green pixels 12 and the red pixels 21.

The blue pixels 11, the red pixels 21, the blue-row green pixels 12, and the red-row green pixels 22 respectively exhibit different response intensities during operation of the image sensor. However, greater differences between the response intensities of the pixels in the blue rows 1 and the response intensities of the pixels in the red rows 2 may occur due to various factors, such as lighting, circuit design characteristics, color differences, lens characteristics of the image-capturing device, etc. With respect to the green pixels, non-uniform color is especially problematic when there is unevenness between the blue-row green pixels 12 and the red-row green pixels 22. The pixel compensation method of the present invention is able to solve color non-uniformity problems caused by such factors.

It is to be noted that the present invention is not limited with respect to the pattern 10 obtained by the image sensor as described above. That is, the method of the present invention contemplates application to image sensors used in conjunction with various types of color filter arrays, and is not limited to application to image sensors using a Bayer filter.

A pixel compensation method according to a preferred embodiment of the present invention will now be described with reference to FIGS. 2 and 3.

Figure 2:
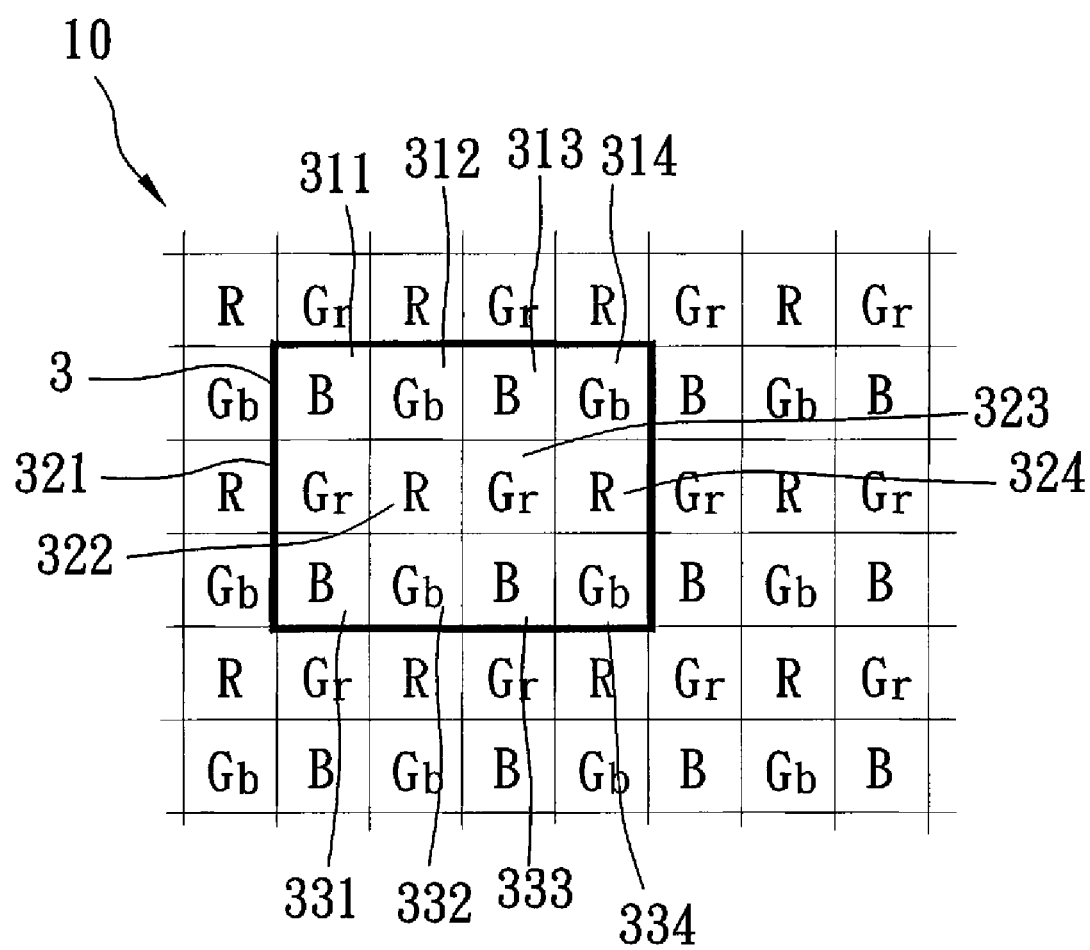
FIG. 2 is a view similar to FIG. 1, but illustrating a first block selected from the pattern according to a preferred embodiment of a pixel compensation method of the present invention.
Figure 3:
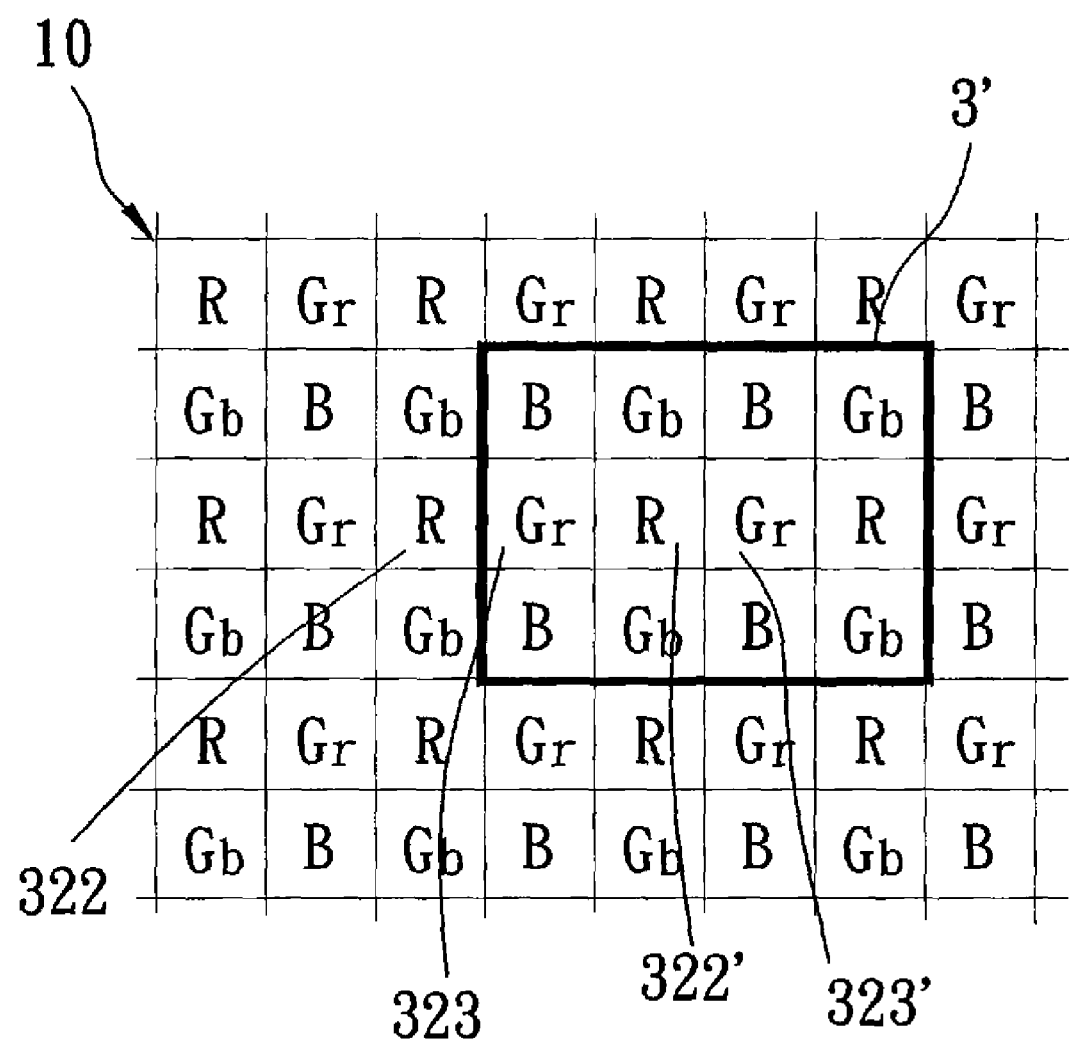
FIG. 3 is a view similar to FIG. 2, but illustrating a second block selected from the pattern according to the preferred embodiment.

Referring first to FIG. 2, a first block 3 of a predetermined number of pixels is selected from the pattern 10. As is evident from FIG. 2, the predetermined number of pixels of the first block 3 is less than a total number of pixels of the pixel pattern 10. In the preferred embodiment, the first block 3 includes twelve pixels formed of three rows and four columns of pixels. To aid in the description of the first block 3, the pixels of the first block 3 are respectively numbered using reference numerals 311, 312, 313, 314, 321, 322, 323, 324, 331, 332, 333, and 334. The pixels 311, 313, 331, and 333 are blue pixels corresponding to the blue pixels 11 of FIG. 1; the pixels 322 and 324 are red pixels corresponding to the red pixels 21 of FIG. 1; the pixels 312, 314, 332, and 334 are blue-row green pixels corresponding to the blue-row green pixels 12 of FIG. 1; and the pixels 321 and 323 are red-row green pixels corresponding to the red-row green pixels 22 of FIG. 1.

The pixels completely surrounded by the other pixels of the first block 3 are designated as pixels that are to undergo compensation (hereinafter referred to as "stand-by compensation pixels"). In this particular example, therefore, the pixels 322 and 323 are the stand-by compensation pixels of the first block 3.

The response intensities of the pixels of the first block 3 determine an area characteristic with respect to the particular area where the first block 3 is located. The area characteristic is used to determine whether or not the stand-by compensation pixels will undergo compensation. When the first block 3 is in a high frequency response area, a relatively high frequency response area, or an extremely high frequency response area, a first compensation value is set at zero, and compensation of the response intensities of the stand-by compensation pixels of the first block 3 is performed using the first compensation value. That is, when the first block 3 is in one of the above three "high" areas, effectively no compensation of the stand-by compensation pixels of the first block 3 is performed. The meanings of these response area terms will become evident from the explanation provided below.

Subsequently, with reference to FIG. 3, a second block 3' is selected from the pattern 10 by, for example, shifting the first block 3 to the right by two pixels, and stand-by compensation pixels of the second block 3' are designated (i.e., pixels 322' and 323'). Compensation of the stand-by compensation pixels of the second block 3' is then performed, where effectively no compensation is performed if it is determined that the second block 3' is in a high frequency response area, a relatively high frequency response area, or an extremely high frequency response area.

The following are the steps involved in determining the response area where a selected block is positioned. The first block 3 of FIG. 2 is used as an example.

In Step 1, it is determined if the first block 3 is in a high frequency response area or a flat response area. The sub-steps involved in Step 1 are described below.

A first threshold value is obtained. In the preferred embodiment, the first threshold value is a predetermined value. When a difference in the response intensities of any two identically colored pixels of the first block 3 is greater than or equal to the first threshold value, the first block 3 is determined to be in a high frequency response area. If this condition is not met, i.e., the differences in the response intensities of all pairs of identically colored pixels of the first block 3 are smaller than the first threshold value, it is determined that the first block 3 is in a flat response area.

In the example shown in FIG. 2, the differences in response intensities between pairs of the blue pixels 311, 313, 331, and 333 are calculated, e.g., the differences in response intensities between the pixels 311 and 313, the pixels 313 and 333, the pixels 333 and 331, and the pixels 331 and 311 are calculated; the difference in response intensities between the red pixels 322 and 324 is calculated; the differences in response intensities between pairs of the blue-row green pixels 312, 314, 332, 334 are calculated, e.g., the differences in response intensities between the pixels 312 and 314, the pixels 314 and 334, the pixels 334 and 332, and the pixels 332 and 312 are calculated; and the difference in response intensities between the red-row green pixels 321 and 323 is calculated. In determining the differences in response intensities between these pixels, if any one of the differences is greater than or equal to the first threshold value, it is determined that the first block 3 is in a high frequency response area, in which case the first compensation value is set at zero. Otherwise, it is determined that the first block 3 is in a flat response area.

When selected from edges of the pattern 10 or from boundary portions corresponding to objects within the pattern 10, the first block 3 is typically determined to be in a high frequency response area. Therefore, Step 1 can ensure that pixels are not erroneously compensated.

In Step 2, if it is determined that the first block 3 is in a flat response area, it is then determined if the first block 3 is in a relatively high frequency response area or a relatively flat response area. The sub-steps involved in Step 2 are described below.

First, using a process that will be described hereinbelow, a second threshold value is obtained. When the difference in response intensities of identically colored pixels in any two rows and in the same column of the first block 3 is greater than the second threshold value, and optionally also has the same gradient, for example, the response intensities of the pixels in these rows are all larger or smaller than the response intensities of identically colored pixels in another row and in the same column, it is determined that the first block 3 is in a relatively high frequency response area. If, on the other hand, the difference in response intensities of identically colored pixels in any two rows and in the same column of the first block 3 is smaller than or equal to the second threshold value, it is determined that the first block 3 is in a relatively flat response area. It is to be noted that the above determinations may also be made on the basis of the response intensities of pixels in any two columns and of the same row, rather than on the basis of the response intensities of pixels in any two rows and in the same column as described above. Use of this alternative approach will be described in the example below.

In the example shown in FIG. 2, the differences in response intensities between the blue pixels 311, 313, 331, 333 of the same row but different columns are calculated, namely, the differences in response intensities between the pixels 311 and 313, and between the pixels 331 and 333 are calculated; the differences in response intensities between the blue-row green pixels 312, 314, 332, 334 of the same row but different columns are calculated, namely, the differences in response intensities between the pixels 312 and 314, and between the pixels 332 and 334 are calculated. If any one of these differences in response intensities is greater than the second threshold value, it is determined that the first block 3 is in a relatively high frequency response area, and the first compensation value is set at zero. Otherwise, it is determined that the first block 3 is in a relatively flat response area.

In Step 3, if it is determined that the first block 3 is in a relatively flat response area, then it is determined if the first block 3 is in an extremely high frequency response area or an extremely flat response area. The sub-steps associated with Step 3 will be described below.

First, a predetermined third threshold value is obtained. In the first block 3, when a difference between (a) an average value of the response intensities of four pixels of the same color and adjacent to one of the stand-by compensation pixels, and (b) the response intensity of the stand-by compensation pixel is greater than or equal to the third threshold value, it is determined that the first block 3 is in an extremely high frequency response area. Otherwise, it is determined that the first block 3 is in an extremely flat response area.

In the example shown in FIG. 2, the green pixels adjacent to the stand-by compensation pixel 323, i.e., the pixels 312, 314, 334, 332 are selected, and an average value of their response intensities is obtained and compared with the response intensity of this particular stand-by compensation pixel 323. When a difference between these two values is greater than or equal to the third threshold value, it is determined that the first block 3 is in an extremely high frequency response area, and the first compensation value is set at zero. Otherwise (i.e., this difference is less than the third threshold value), it is determined that the first block 3 is in an extremely flat response area.

Through the above steps, it may be determined whether the first block 3 is in a high frequency response area, a relatively high frequency response area, or an extremely high frequency response area. It is to be noted that during the above determinations, there are no limitations with respect to which of the determinations is made prior or subsequent to any other determination. Preferably, the present invention further includes step 1-1 in which a contrast area where the first block 3 is located is determined based on the response intensities of all the pixels of the first block 3. The second threshold value is then established according to the contrast area where the first block 3 is located, thereby resulting in more efficient and accurate removal of factors causing erroneous compensation. More preferably, step 1-1 of determining the contrast area where the first block 3 is located is performed subsequent to step 1 of determining if the first block 3 is in a high frequency response area, and prior to step 2 of determining if the first block 3 is in a relatively high frequency response area. Step 1-1 is described in more detail below.

Using predetermined first, second, and third contrast threshold values, where the first contrast threshold value is smaller than the second contrast threshold value, and the second contrast threshold value is smaller than the third contrast threshold value, the contrast area where the first block 3 is positioned is determined according to the response intensities of all the pixels of the first block 3 considered individually. When the response intensity of each of the pixels 311, 312, 313, 314, 321, 322, 323, 324, 331, 332, 333, 334 of the first block 3 is smaller than the first contrast threshold value, it is determined that the first block 3 is in a first contrast area. However, when the response intensity of any one of the pixels 311, 312, 313, 314, 321, 322, 323, 324, 331, 332, 333, 334 of the first block 3 is greater than or equal to the first contrast threshold value and smaller than the second contrast threshold value, it is determined that the first block 3 is in a second contrast area. Further, when the response intensity of each of the pixels 311, 312, 313, 314, 321, 322, 323, 324, 331, 332, 333, 334 of the first block 3 is greater than or equal to the second contrast threshold value and smaller than the third contrast threshold value, it is determined that the first block 3 is in a third contrast area.

While performing step 2, the obtained second threshold value has different predetermined values according to the contrast area where the first block 3 is located. In the preferred embodiment, the value of the second threshold value corresponding to the first contrast area is smaller than the value of the second threshold value corresponding to the second contrast area, and the value of the second threshold value corresponding to the second contrast area is smaller than the value of the third threshold value corresponding to the third contrast area. Because the response intensities (brightnesses) of the pixels of the first block 3 are all different, the differences between the response intensities of the pixels are also all different. Therefore, in step 2, the determination as to whether the first block 3 is in a relatively high frequency response area or a relatively flat response area is made based on the second threshold value, which is obtained differently for the different contrast areas, thereby further enhancing compensation accuracy.

In the above steps, it is determined whether the first block 3 is in a high frequency response area, a relatively high frequency response area, or an extremely high frequency response area, and effectively no compensation is performed when the first block 3 is in one of these areas. Next, a subsequent second block 3' is selected. When the first block 3 is not in a high frequency response area, a relatively high frequency response area, or an extremely high frequency response area, compensation is performed. That is, only when the first block 3 is in an extremely flat response area is compensation of the stand-by compensation pixels 322 and 323 of the first block 3 performed. The steps to perform compensation are described in the following.

First, the first compensation value is determined. The first compensation value is a difference between the response intensity of one of the stand-by compensation pixels and an average value of response intensities of identically colored pixels of the first block 3 adjacent to the one of the stand-by compensation pixels. Next, the first compensation value is used to adjust the response intensities of both of the stand-by compensation pixels.

As an example, an average value of the response intensities of the blue-row green pixels 312, 314, 334, 332 is obtained, and a difference between this average value and the response intensity of the stand-by compensation pixel 323 is determined. The first compensation value is determined according to this difference, and compensation of both of the stand-by compensation pixels 322 and 323 is performed using the first compensation value thus obtained.

Following compensation of the stand-by compensation pixels of the first block 3 in an extremely flat response area, a subsequent block, i.e., the second block 3', is selected from the pattern 10, after which processes similar to those performed with respect to the first block 3 are performed. That is, in the preferred embodiment, a second compensation value is obtained, and compensation of the stand-by compensation pixels 322' and 323' of the second block 3' is performed according to both this second compensation value and the first compensation value of the first block 3. Selection and compensation of blocks from the pattern 10 are continued in this manner until compensation of all the pixels in a particular set of rows has been performed, after which a new block is selected by, for example, shifting the present block downwardly by two rows and back to the start of a new set of rows. The shifting process along the new set of rows is then repeated. This process is continued until compensation of all the pixels in the pattern 10 has been performed. With compensation thus performed, the newly obtained pattern is one having color evenness.

It is important to note that since the selection and compensation of the blocks are consecutive processes, during compensation of the stand-by compensation pixels in the blocks, in addition to the compensation value obtained for the presently selected block, the compensation value obtained for the previously selected block may also be referenced to perform compensation as described above. In the example shown in FIG. 3, during compensation of the pixels 322' and 323' of the second block 3', its compensation value is equal to the sum of the first compensation value times a weighted value and the second compensation value times another weighted value, and the compensation value thus obtained is used to perform compensation of the pixels 322' and 323'.

From the aforementioned, the present invention uses a difference in response intensities between stand-by compensation pixels and pixels adjacent thereto, such that color uniformity may be realized. In addition, by determining the area of location of the stand-by compensation pixels, it is possible to eliminate compensation errors. Further, using the inherent differences of pixels under different brightness levels, different threshold values are given to contrast areas of different brightness levels to determine whether or not to perform compensation, thereby further enhancing precision. Finally, by dynamically adjusting the compensation value each time compensation of the stand-by compensation pixels is performed, even greater compensation precision may be realized.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A pixel compensation method to be implemented by an image-capturing device having an image sensor for obtaining image frames each including a pixel pattern of a plurality of pixels, each of the pixels of the pixel pattern having a frequency response intensity, said pixel compensation method comprising:
   a) selecting a first block of a predetermined number of pixels within one image frame from the pixel pattern obtained by the image sensor, the predetermined number of pixels of the first block being less than a total number of pixels of the pixel pattern;
   b) designating at least one pixel from the pixels of the first block as a stand-by compensation pixel;
   c) determining a first compensation value according to the frequency response intensities of the pixels of the first block within the one image frame without referring to frequency response intensities of pixels of another image frame; and
   d) adjusting the frequency response intensity of the stand-by compensation pixel according to the first compensation value.

2. The pixel compensation method of claim 1, wherein step c) includes:
   c-1) determining that the first block is in one of a flat frequency response area and a high frequency response area according to differences in the frequency response intensities of the pixels of the first block; and
   c-2) setting the first compensation value to zero when the first block is in a high frequency response area.

3. The pixel compensation method of claim 2, wherein step c-1) includes:
   determining that the first block is in a flat frequency response area when all differences in the frequency response intensities of all pairs of identically colored pixels of the first block are less than a predetermined first threshold value; and
   determining that the first block is in a high frequency response area when a difference in the frequency response intensities of any one pair of identically colored pixels of the first block is not less than the first threshold value.

4. The pixel compensation method of claim 2, wherein step c) further includes:
   c-3) when the first block is in a flat frequency response area, determining that the first block is in one of a first contrast area and a second contrast area by taking into account the frequency response intensities of all of the pixels of the first block individually, the frequency response intensities of the pixels of the first block being lower when the first block is in a first contrast area than when in a second contrast area.

5. The pixel compensation method of claim 4, wherein step c-3) includes:
   determining that the first block is in a first contrast area when the frequency response intensity of each of the pixels of the first block is less than a predetermined contrast threshold value; and
   determining that the first block is in a second contrast area when the frequency response intensity of any one pixel of the first block is not less than the contrast threshold value.

6. The method of claim 5, wherein step c-3) further includes:
   c-4) when the first block is in a flat frequency response area, determining that the first block is in one of a relatively flat frequency response area and a relatively high frequency response area according to differences in the frequency response intensities of identically colored pixels of the first block; and
   c-5) setting the first compensation value to zero when the first block is in a relatively high frequency response area.

7. The pixel compensation method of claim 6, wherein the pixels of the first block are arranged in columns and rows, and step c-4) includes:
   determining a second threshold value according to the contrast area where the first block is positioned;
   determining that the first block is in a relatively flat frequency response area when differences in the frequency response intensities of identically colored pixels of any two columns and the same row of the first block are all not greater than the second threshold value; and
   determining that the first block is in a relatively high frequency response area when any one of the differences in the response intensities of identically colored pixels of any two frequency columns and the same row of the first block is greater than the second threshold value.

8. The pixel compensation method of claim 6, wherein the pixels of the first block are arranged in columns and rows, and step c-4) includes:
   determining a second threshold value according to the contrast area where the first block is positioned;
   determining that the first block is in a relatively flat frequency response area when differences in the frequency response intensities of identically colored pixels of any two rows and the same column of the first block are all not greater than the second threshold value; and
   determining that the first block is in a relatively high frequency response area when any one of the differences in the frequency response intensities of identically colored pixels of any two rows and the same column of the first block is greater than the second threshold value.

9. The pixel compensation method of claim 1, wherein step c) includes:
   c-6) calculating the first compensation value according to a difference between the frequency response intensity of the stand-by compensation pixel and an average value of the frequency response intensities of the identically colored pixels of the first block that are adjacent to the stand-by compensation pixel.

10. The pixel compensation method of claim 9, wherein step c-6) includes:
    setting the first compensation value to zero when the difference between the frequency response intensity of the stand-by compensation pixel and the average value of the frequency response intensities of the identically colored pixels of the first block that are adjacent to the stand-by compensation pixel is not less than a predetermined third threshold value; and setting the first compensation value as the difference between the frequency response intensity of the stand-by compensation pixel and the average value of the frequency response intensities of the identically colored pixels of the first block that are adjacent to the stand-by compensation pixel when the difference between the frequency response intensity of the stand-by compensation pixel and the average value of the frequency response intensities of the identically colored pixels of the first block that are adjacent to the stand-by compensation pixel is less than the third threshold value.

11. The pixel compensation method of claim 1, wherein the image sensor is one of a complementary metal oxide semiconductor image sensor and a charge coupled device image sensor.

12. The pixel compensation method of claim 1, wherein, in step a), the selected first block includes twelve pixels arranged in three rows and four columns, and in step b), two of the pixels are designated as the stand-by compensation pixels, one of the stand-by compensation pixels being the pixel in the second row, second column of the first block, and the other of the stand-by compensation pixels being the pixel in the second row, third column of the first block.

13. The pixel compensation method of claim 1, further comprising:
   e) selecting a second block of the predetermined number of pixels from the pixel pattern obtained by the image sensor;
   f) designating at least one pixel from the pixels of the second block as a stand-by compensation pixel;
   g) determining a second compensation value according to the frequency response intensities of the pixels of the second block;
   h) adjusting the frequency response intensity of the stand-by compensation pixel of the second block according to at least the second compensation value; and
   i) repeating steps e) through h) until compensation of all the pixels of the pixel pattern has been performed.

14. The pixel compensation method of claim 13, wherein, in step h), the frequency response intensity of the stand-by compensation pixel of the second block is adjusted according to both the first compensation value and the second compensation value.

* * * * *